H. M. REITER.
SAFETY BRAKE.
APPLICATION FILED JAN. 28, 1910.
979,336.
Patented Dec. 20, 1910.
2 SHEETS—SHEET 1.
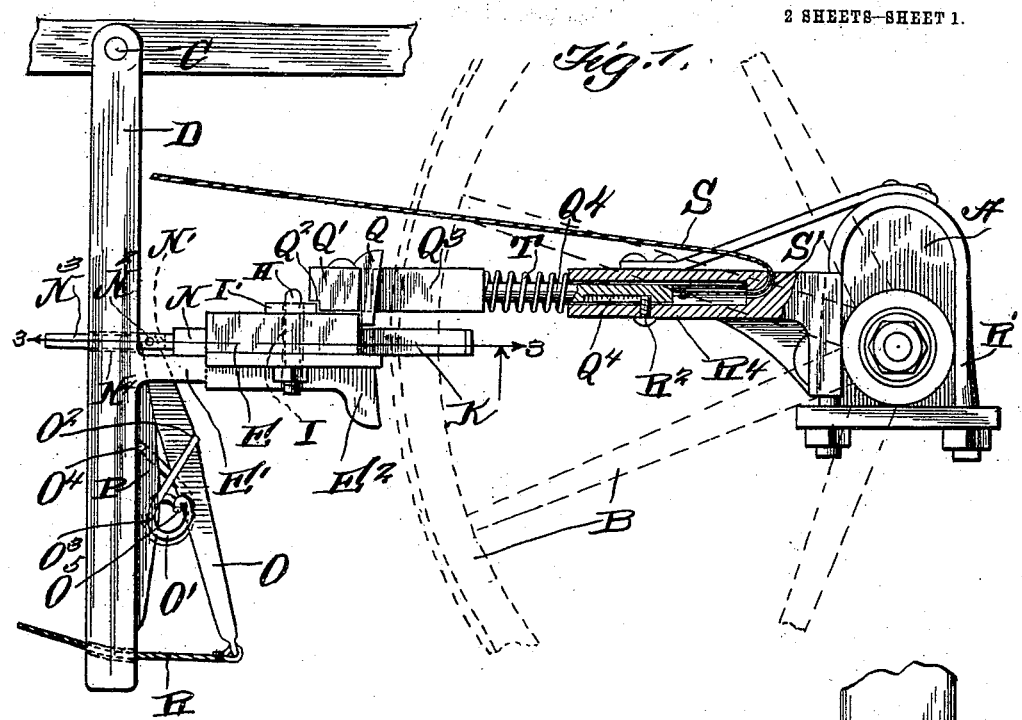
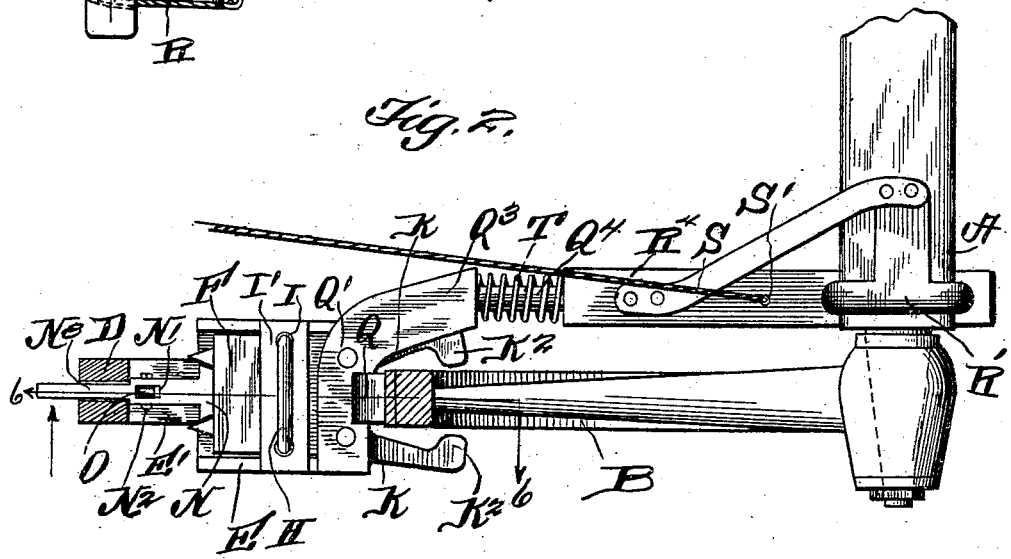

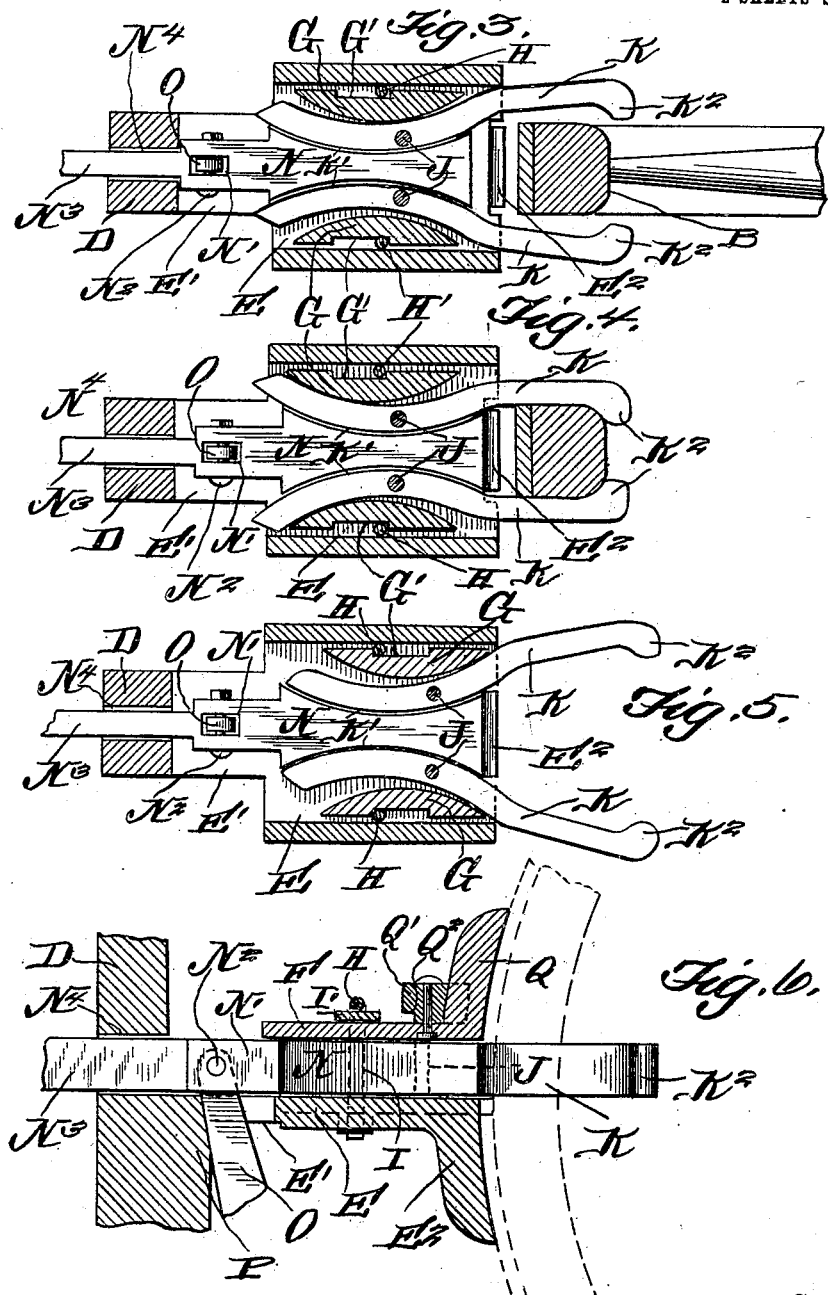

UNITED STATES PATENT OFFICE.

HEINRICH MAX REITER, OF ASHEVILLE, NORTH CAROLINA.

SAFETY-BRAKE.

979,336.  Specification of Letters Patent.  Patented Dec. 20, 1910.

Application filed January 28, 1910. Serial No. 540,659.

*To all whom it may concern:*

Be it known that I, HEINRICH M. REITER, a citizen of the United States, residing at Asheville, in the county of Buncombe and State of North Carolina, have invented certain new and useful Improvements in Safety-Brakes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in double acting safety clench brakes for vehicle brakes of various kinds and comprises a simple and efficient apparatus of this nature having various details of construction, combinations and arrangements of parts which will be hereinafter fully described and then specifically defined in the appended claims.

I illustrate my invention in the accompanying drawings, in which:—

Figure 1 is a side elevation showing the application of my brake to the frame of a vehicle. Fig. 2 is a top plan view. Fig. 3 is a sectional view on line 3—3 of Fig. 1. Fig. 4 is a view similar to Fig. 3, showing the clencher jaws thrown into operative positions for gripping the rim of a wheel. Fig. 5 is a similar view showing the clencher jaws moved forward to apply the frictional brake, and Fig. 6 is a sectional view on line 6—6 of Fig. 2.

Reference now being had to the details of the drawings by letter, A designates the axle of a vehicle upon which the rear wheel B is journaled. Pivotally mounted upon a pin carried by a portion of the running gear is a bar D having a laterally extending portion E' which is fastened to the casing E which is provided with flanges and contains the plate F having a slight movement between the flanges. Projecting from the plate F are the wings G which are convexed upon their adjacent faces and each is provided with a recess G' upon its outer flat face, said recesses terminating in shoulders. A crosspiece I' is fastened to the flanges in said casing and has apertures for the reception of the angled ends of the rod H, which latter extend through said recesses and their lower ends are fastened by means of nuts, one of which is shown in Fig. 1 of the drawings. Mounted within said casing are the clencher jaws K which have angled ends $K^2$ designed to grip the felly of a wheel in the manner shown in Fig. 4 of the drawings. The shank portions of said jaws, which are mounted upon the pivots J which move with the plate F, are convexed as at K' and adapted to contact with the concaved edges of the reciprocating member N whereby the clencher jaws may be thrown into or out of operative relation with the felly of the wheel. One end of said member N is contracted as at $N^3$ and is guided through an aperture in the bar D and is slotted as at N' for the reception of the lever O which is pivotally mounted upon a pin $N^2$. A spring $O^3$ is bent to form a coil O' and one end $O^4$ engages an aperture in a rib P upon the bar D, the coil of said spring serving as a fulcrum for the lever O and the other end of the spring $O^2$ engages an indenture in the edge of the lever O. A rope R is fastened to the end of the lever O and passes through an aperture in the bar D and affords means whereby the clencher jaws may be operated independent of the movement of the brake shoes Q and $E^2$.

Fixed to the plate F is a member Q' having an integral arm $Q^3$ with a contracted portion $Q^4$, and Q is a brake shoe which is fixed to and moves with the plate F and $E^2$ is a brake shoe which is fixed to said casing E. Fastened to the axle of the vehicle by means of a staple-shaped member R' is an extension arm $R^4$ which is hollow and adapted to receive the contracted end $Q^4$ of the arm $Q^3$, said contracted portion being slotted at $Q^5$ for the reception of the screw $R^3$ which serves to limit the movement of said contracted portion of the arm. A spring T is interposed between a shoulder upon the arm $Q^3$ and the end of the extension $R^4$, the purpose of which is to normally throw the brake mechanism from the wheel when the brake is not in use.

A rope S passes through an aperture S' leading into the chamber portion of the extension $R^4$ and is fastened to the inner end of the contracted part $Q^4$ of the arm $Q^3$, and affords means for drawing the plate F forward slightly when it is desired to allow the clencher jaws to have a farther outward reach as in Fig. 5 than in positions shown in Fig. 3.

The operation of the brake is as follows:— When it is desired to apply the brake shoes Q and E², it may be done by a swinging movement imparted to the bar D by any suitable lever mechanism, not shown of a common construction employed upon vehicles. In the event of it being desired to apply the clencher jaws to assume the positions shown in Fig. 4, it may be done by pulling upon the rope R which will cause the concaved edges of the member N to tilt the jaws K to grip the felly of the wheel. Should it be desired to cause the jaws K to have a farther reach, as shown in Fig. 5, the jaws may be drawn forward slightly by pulling upon the arm $Q^3$ toward the axle A, which will throw the shoe Q, which moves with the plate F, toward the wheel. The spring T serves to unset the brake shoes when the pull is released upon the arm $Q^3$.

What I claim to be new is:—

1. A brake for vehicle wheels comprising, in combination with the frame of the vehicle, axle and wheel thereon, a sliding plate supported by the frame of the vehicle, clencher jaws pivotally connected to said plate, a member adapted to actuate said clencher jaws to grip the rim of a wheel, and a brake shoe fixed to said plate.

2. A brake for vehicle wheels comprising, in combination with the frame of the vehicle, axle and wheel thereon, a sliding plate supported by the frame of the vehicle, clencher jaws pivotally connected to said plate, the inner edges of the shank portions of said jaws being inclined, a bar with opposite inclined edges movable intermediate said inclined edges of the jaws and adapted to tilt the jaws as the bar is moved longitudinally, and a spring-pressed lever mounted upon an attachment of the frame and pivotally connected to said bar and adapted to move the same longitudinally to cause the jaws to open and close.

3. A brake for vehicle wheels comprising, in combination with the frame of the vehicle, axle and wheel thereon, a sliding plate supported by the frame of the vehicle, clencher jaws pivotally connected to said plate, a brake shoe fixed to said plate, a spring-pressed arm fastened to said brake shoe, and means for moving the latter toward the vehicle wheel.

4. A brake for vehicle wheels comprising, in combination with the frame of the vehicle, axle and wheel thereon, a sliding plate supported by the frame of the vehicle, clencher jaws pivotally connected to said plate, a brake shoe fixed to said plate, a socket member fixed to the axle, a plate fixed to said brake shoe and having an arm telescoping within said socket member, a spring interposed between the end of said socket member and the shoulder upon said arm, and a rope fastened to the telescoping end of said arm.

5. A brake for vehicle wheels comprising, in combination with the frame of the vehicle, axle and wheel thereon, a sliding plate supported by the frame of the vehicle, clencher jaws pivotally connected to said plate, a brake shoe fixed to said plate, a socket member fixed to the axle, a plate fixed to said brake shoe and having an arm telescoping within said socket member, a rope fastened to the telescoping end of said arm, and a pin passing through the wall of said socket member and engaging a slot in the telescoping portion of said arm.

6. A brake for vehicle wheels comprising, in combination with the vehicle frame, axle and wheel thereon, a bar fixed to said frame and having a laterally extending arm, a casing upon said arm, a plate movable within said casing and having depending wings, convexed upon their adjacent faces, means for limiting the movements of said wings in opposite directions, clencher jaws pivoted to said plate and having their outer edges concaved and their inner faces convexed, a longitudinally movable bar mounted intermediate said clencher jaws and having its opposite edges concaved, a spring-pressed lever pivotally connected to the shank portion of said bar, and a cord fastened to said lever.

7. A brake for vehicle wheels comprising, in combination with the vehicle frame, axle and wheel thereon, a bar fixed to said frame and having a laterally extending arm, a casing upon said arm, a plate movable within said casing and having depending wings, convexed upon their adjacent faces, a cross-piece extending over said plate, a staple shaped member passing through apertures in said cross-piece and engaging recesses formed in the outer faces of said wings and adapted to coöperate with the end walls of the recess to limit the longitudinal movements of the wings, clencher jaws pivoted to the plate and positioned intermediate said wings, the outer faces of the shank portions of the clencher jaws being concaved and their inner faces convexed, a bar concaved upon its opposite edges and mounted intermediate the convexed portions of the clencher jaws, and spring-actuated means for moving said bar longitudinally to cause the clencher jaws to open and close.

In testimony whereof I hereunto affix my signature in the presence of two witnesses.

HEINRICH MAX REITER.

Witnesses:
 PHIL ZAGEIR,
 ISADOR TOBIUSKY.